United States Patent
Singer et al.

(10) Patent No.: US 9,348,793 B2
(45) Date of Patent: May 24, 2016

(54) METHOD AND SYSTEM FOR ADJUSTING PERFORMANCE BASED ON VEHICLE OCCUPANTS

(71) Applicant: GM GLOBAL TECHNOLOGY OPERATIONS LLC, Detroit, MI (US)

(72) Inventors: Ian R. Singer, Macomb, MI (US); Frank C. Valeri, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 13/778,297

(22) Filed: Feb. 27, 2013

(65) Prior Publication Data

US 2014/0244106 A1   Aug. 28, 2014

(51) Int. Cl.
*G06F 17/00* (2006.01)
*G10K 11/178* (2006.01)
*H04R 1/10* (2006.01)
*B60H 1/00* (2006.01)

(52) U.S. Cl.
CPC ............ *G06F 17/00* (2013.01); *B60H 1/00742* (2013.01); *G10K 11/178* (2013.01); *H04R 1/1083* (2013.01); *B60H 2001/00185* (2013.01); *G10K 2210/1282* (2013.01); *G10K 2210/3016* (2013.01); *H04R 2420/01* (2013.01); *H04R 2499/13* (2013.01)

(58) Field of Classification Search
CPC .... H04R 1/1083; H04R 5/00; H04R 2420/01; H04R 2499/13; B60H 1/00742; B60H 2001/00185; G10K 2210/1282; G10K 2210/3016; G10K 2210/3028; G06F 17/00
USPC .............. 701/1, 36, 49; 381/71.1, 71.4, 71.11
See application file for complete search history.

(56) References Cited

U.S. PATENT DOCUMENTS 6,007,095 A * 12/1999 Stanley ......................... 280/735
6,304,179 B1 * 10/2001 Lotito et al. ................ 340/545.3
6,454,178 B1    9/2002 Fusco et al.

(Continued)

FOREIGN PATENT DOCUMENTS

CN    101332785 A    12/2008
CN    101877808 A    11/2010

(Continued)

OTHER PUBLICATIONS

Chinese Office Action issued Sep. 22, 2015 No. 201410068304.1; pp. 8.

*Primary Examiner* — Thomas G Black
*Assistant Examiner* — Ce Li
(74) *Attorney, Agent, or Firm* — Cantor Colburn LLP

(57) ABSTRACT

A vehicle having a system is provided. The system has at least one operating output. The system includes an occupant module and a vehicle system module. The occupant module receives at least one occupant signal indicative of occupants currently located within the vehicle, and determines a current number and location of occupants in the vehicle based on the occupant signal. The vehicle system module receives as input the current number of occupants located in the vehicle. The vehicle system module is configured for determining whether the current number of occupants located in the vehicle is less than a total number of occupants the vehicle is configured to seat. The vehicles system module is configured for adjusting the at least one operating output of the system if the current number of occupants located in the vehicle is less than the total number of occupants the vehicle is configured to seat.

13 Claims, 1 Drawing Sheet

(56) References Cited

U.S. PATENT DOCUMENTS

2008/0143835 A1\* 6/2008 Abe et al. .................. 348/148
2010/0124337 A1\* 5/2010 Wertz et al. ............... 381/71.11
2011/0074565 A1\* 3/2011 Cuddihy et al. ............ 340/457

FOREIGN PATENT DOCUMENTS

| JP | 2000225838 A | 8/2000 |
| JP | 2006188092 A | 7/2006 |

\* cited by examiner

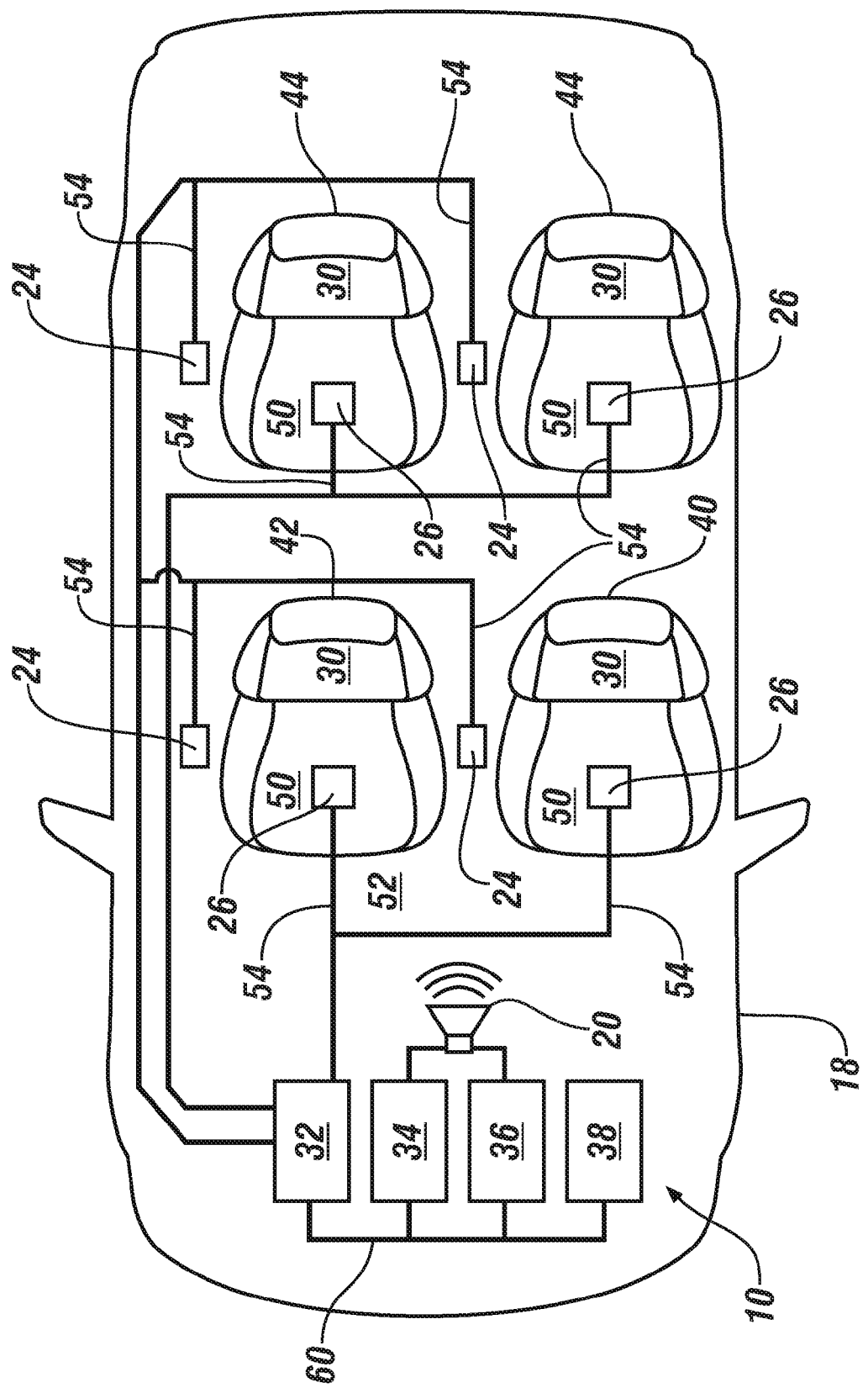

METHOD AND SYSTEM FOR ADJUSTING PERFORMANCE BASED ON VEHICLE OCCUPANTS

FIELD OF THE INVENTION

Exemplary embodiments of the invention relate to a system for a vehicle and, more particularly, to a system having at least one operating output that is adjusted based on the number and location of occupants located in the vehicle.

BACKGROUND

Some types of vehicle systems may be specifically calibrated or tuned based on an assumption that there are occupants always present in each seat of a vehicle. For example, a vehicle system may be tuned to accommodate the occupants seated in a driver seat, a passenger seat, second row seats, and third row seats (if available). However, tuning the vehicle system to accommodate every single occupant located in the vehicle may impact the performance of the vehicle system. Specifically, the performance of the vehicle system for one or a few of the occupants may be reduced in order to provide an adequate level of performance for all of the occupants located in the vehicle.

In one example, an active noise cancellation system ("ANC") system may be used to attenuate the amount of unwanted sound in the vehicle. In particular, the ANC system may include a speaker for emitting a cancelling noise that attenuates engine sound. The ANC system is generally tuned to accommodate all of the occupants in the vehicle (e.g., occupants in the driver seat, the passenger seat, the second row seats, and the third row seats, if available). However, accommodating the occupants in the second row seats and the third row seats may reduce the amount of sound cancellation provided to the front row occupants. Therefore, even if there are no occupants present in the second row seats or the third row seats, the overall performance of the ANC system is still impacted, and the amount of noise cancellation provided to the front row occupants (e.g., the driver and the passenger) is still reduced. Accordingly, it is desirable to provide a vehicle system that is able to adjust performance based on the occupants located in a vehicle.

SUMMARY OF THE INVENTION

In one exemplary embodiment of the invention, a vehicle having a system is provided. The system has at least one operating output. The system includes an occupant module and a vehicle system module. The occupant module receives at least one occupant signal indicative of occupants currently located within the vehicle, and determines a current number of occupants in the vehicle based on the occupant signal. The vehicle system module receives as input the current number of occupants and where they are located in the vehicle. The vehicle system module is configured to determine whether the current number of occupants located in the vehicle is less than a total number of occupants the vehicle is configured to seat. The vehicle system module is configured to adjust the at least one operating output of the system whether the current number of occupants located in the vehicle is less than the total number of occupants the vehicle is configured to seat.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

The FIGURE is a schematic illustration of a vehicle that includes a control system and a plurality of seats.

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, or a combinational logic circuit.

Referring now to the FIGURE, an exemplary embodiment is directed to a control system 10 for a vehicle 18. The control system 10 includes one or more speakers 20, a plurality of seatbelt switches or sensors 24, a plurality of occupant sensors 26 that are each located within a corresponding seat 30, an occupant control module 32, an active noise cancellation ("ANC") control module 34, an audio control module 36, and a heating, ventilation, and air conditioning ("HVAC") control module 38. The occupant control module 32 is in communication with the ANC control module 34, the audio control module 36, and the HVAC control module 38. In the exemplary embodiment as shown in the FIGURE, the vehicle 18 includes four seats 30, however it is to be understood that fewer or more seats may be included as well. In the embodiment as shown in the FIGURE, a driver seat 40, a front passenger seat 42, and two second row seats 44 are illustrated. In an alternative embodiment, the vehicle 18 may also include third-row seats (not shown) as well.

Each seat 30 includes one of the occupant sensors 26 located along a bottom portion 50 within the seat 30. The occupant sensors 26 indicate the presence of an occupant within the seat 30 based on pressure or electrical capacitance. Each seat 30 is associated with one of the seatbelt sensors 24. Each seatbelt sensor 24 indicates if a seatbelt (not shown) corresponding to the seat 30 is latched. It should be noted that while the FIGURE illustrates both seatbelt sensors 24 and occupant sensors 26 corresponding to the seats 30, only one set of sensors (e.g., either the seatbelt sensors 24 or the occupant sensors 26) may be utilized.

The occupant control module 32 receives as input at least one occupant signal 54. The occupant signal 54 indicates the presence of an occupant or individual seated within one of the seats 30. The occupant signal 54 also indicates which specific seat 30 is occupied (e.g., the driver seat 40, the passenger seat 42, or one of the second row seats 44). Specifically, for example, if four occupants are present within an interior cabin 52 of the vehicle 18, then the occupant control module 32 would receive four occupant signals 54. One of the four occupant signals 54 would indicate the presence of an occupant in the driver seat 40, another one of the four occupant signals 54 would indicate the presence of an occupant in the passenger seat 42, and the remaining two occupant signals 54 would indicate the presence of occupants in the two second row seats 44. In one embodiment, the occupant signal 54 may be generated by one of the occupant sensors 26. Alternatively, in another embodiment, the occupant signal 54 may be generated by one of the seatbelt sensors 24. Although the occupant sensors 26 and the seatbelt sensors 24 are discussed, it is understood that any other approach may be used as well to determine the occupant signal 54 as well.

The occupant control module 32 includes control logic for determining a current number of occupants that are located within the interior cabin 52 of the vehicle 18 based on the occupant signals 54 received by either the occupant sensors 26 or the seatbelt sensors 24. The occupant control module 32 also determines which specific seats 30 currently have an occupant present based on the occupant signals 54. For example, the occupant control module 32 may receive two occupant signals 54, where one of the occupant signals 54 indicates an occupant is present within the driver seat 40, and the other occupant signal 54 indicates an occupant is present in the passenger seat 42. Based on the two occupant signals 54, the occupant control module 32 generates a control signal 60. The control signal 60 indicates the number of occupants in the vehicle 18 (e.g., in this present example, there are two occupants), as well as specific seats 30 that currently have an occupant seated (e.g., the driver seat 40 and the passenger seat 42).

The control signal 60 is sent to one or more control modules. The control modules are used for operating a vehicle system. The vehicle system is generally any type of system that is specifically calibrated or tuned based on the number of occupants currently present in the vehicle 18. The vehicle system may also be tuned based on the specific seat or seats 30 that are currently occupied by an individual. Some examples of such vehicle systems include, but are not limited to, an ANC system used to attenuate unwanted noise, an HVAC system, an audio system, a transmission control module ("TCM"), an engine control module (ECM), heated seats, a suspension system, or an interior lighting system. In the embodiment as shown in the FIGURE, the occupant control module 32 sends the control signal 60 to the ANC control module 34, the audio control module 36, and the HVAC control module 38. It should be noted that while the FIGURE illustrates the ANC control module 34, the audio control module 36, and the HVAC control module 38, the control signal 60 may be sent to fewer control modules, or other control modules (not shown) as well.

The control signal 60 is used to adjust or modify at least one operating output of the vehicle system based on a current number of occupants present in the vehicle 18. The at least one operating output of the vehicle system refers to any output generated by the vehicle system that is specifically calibrated based on the number of occupants present in the vehicle 18 and the specific seat or seats 30 that are occupied by an individual. Some examples of operating outputs include, but are not limited to, a cancelling sound emitted by the speakers 20 in the ANC system, a multi-zone control of the HVAC system (which is described in detail below), surround sound settings of the audio system, and lighting of the interior lighting system. For example, if the control signal 60 indicates there are no occupants located in the second row seats 44, then interior lights (not shown) corresponding to the second row seats 44 may be disabled. Specifically, for example, interior lighting located along an interior door handle (not shown) may be disabled.

The control module or modules (e.g., ANC control module 34, the audio control module 36, and the HVAC control module 38) may adjust at least one operating output of the vehicle system if the current number of occupants located in the vehicle 18 is less than a total number of occupants the vehicle 18 is configured to seat. For example, in the embodiment as shown in the FIGURE, the total number of occupants the vehicle 18 is configured to seat would be four. However, it is understood that the total number of occupants may be more or less, depending on the number of seats 30 provided. The control module or modules may also adjust at least one operating output of the vehicle system based on the specific seating position of the current occupants present in the vehicle 18 as well.

The control module or modules may have various settings saved in memory. The various settings represent different configurations of the operating output that are based on the current number of occupants and the specific seating position of the current occupants present in the vehicle 18. The control module or modules select one of the various settings of the operating output based on the current number of occupants located and the specific seating position of the current occupants present. In one embodiment, the control module may have a setting based on occupants present in the driver seat 40, the front passenger seat 42, the second row seats 44, and the third row seats (not shown), another setting based on occupants present in the driver seat 40, the front passenger seat 42, and the second row seats 44, another setting based on occupants present in the driver seat 40 and the front passenger seat 42, and a setting based on one occupant present in the driver seat 40.

In one embodiment, the vehicle system is the ANC system, and the ANC control module 34 may have various settings saved in memory related to the cancelling sounds that are emitted from the speaker 20 to attenuate powertrain noise. The ANC control module 34 may adjust the cancelling sounds emitted from the speakers 20 by selecting a specific setting saved in memory that corresponds to the current number of occupants and the specific seating position of the current occupants present in the vehicle 18.

The ANC system may reduce amount of sound cancellation provided to one of the occupants in the vehicle 18 in order to provide sound cancellation to the remaining occupants in the vehicle 18. For example, if occupants are located in the driver seat 40, the front passenger seat 42, the second row seats 44, and third row seats (not shown), then the level of sound cancellation provided to occupants located in the driver seat 40, the passenger seat 42 and the second row seats 44 may be reduced in order to provide a level noise cancellation to the occupants in the third row seats. Another setting of sound cancellation may be based on whether occupants are located in the driver seat 40, the front passenger seat 42, and the second row seats 44. With this setting, the level of sound cancellation provided to occupants located in the driver seat 40 and the front passenger seat 42 may be reduced in order to provide acceptable noise cancellation to the occupants in the second row seats 44. Another setting may be based on whether there are occupants located in the driver seat 40 and the front passenger seat 42. With this setting, the level of sound cancellation provided to the occupant in the driver seat 40 may be reduced in order to provide an acceptable level of noise cancellation to the occupant in the passenger seat 42. Finally, there may be a setting based on whether only one occupant is located in the driver seat 40.

In another embodiment, the vehicle system is the audio system, and the audio control module 36 may have various settings such as surround sound based on the specific occupants located in the vehicle 18. Specifically, the surround sound may be adjusted to accommodate only one or a portion of the total number of occupants in the vehicle 18. Adjusting the surround sound based on only one or a portion of the total number of occupants may result in enhanced performance of the surround sound system and an improved overall experience to the occupant or occupants in the vehicle 18. For example, one setting of the surround sound saved in memory of the audio control module may be based on whether there are occupants located in the driver seat 40, the front passenger seat 42, the second row seats 44, and third row seats (not shown). Another setting of the surround sound may be based on whether there are occupants are located in the driver seat 40, the front passenger seat 42, and the second row seats 44. Another setting may be based on whether there are occupants located in the driver seat 40 and the front passenger seat 42. Finally, there may be a setting based on whether there is only one occupant located in the driver seat 40.

In yet another embodiment, the vehicle system is the HVAC system, and the HVAC control module 38 may have various settings related to a multi-zone control saved in memory. The multi-zone control refers to a level of control that may be provided to one or more occupants of the vehicle 18 to adjust various settings of the HVAC system. Some examples of the settings include, but are not limited to, air temperature, fan speed, or mode (e.g., vent, floor, bi-level, defrost, etc.). Specifically, the multi-zone control may refer to a single-zone mode of operation where a driver may only adjust the settings of the HVAC system, a dual zone mode of operation where a driver and a front passenger may adjust the settings of the HVAC system, a tri-zone mode of operation where a driver, a passenger, and at least one of the second row occupants may adjust the HVAC settings, or a quad-zone mode of operation where a driver, a passenger, and both the second row occupants may adjust the HVAC settings (or instead of both second row occupants, the third row passengers may adjust the HVAC settings).

For example, if the control signal 60 indicates an occupant present in only the driver seat 40, then the HVAC system is adjusted to operate in a single-zone mode of operation. If the control signal 60 indicates occupants present in the driver seat 40 and the front passenger seat 42, then the HVAC system is adjusted to operate in the dual-zone mode of operation. If the control signal 60 indicates occupants present in the driver seat 40, the front passenger seat 42, and one of the second row seats 44, then the HVAC system is adjusted to operate in the tri-zone mode of operation. If the control signal 60 indicates occupants present in the driver seat 40, the front passenger seat 42, and both the second row seats 44, then the HVAC system is adjusted to operate in the quad-zone mode of operation.

The control system 10 as described above may provide improved or enhanced system performance based on the location of the occupants currently located in the vehicle 18. Some types of vehicle systems currently available may be specifically calibrated or tuned based on an assumption that there are occupants present in each seat of a vehicle. However, the performance of the vehicle system for one or more occupants (e.g., the occupants in the driver seat and the front passenger seat) may be reduced in order to provide an adequate level of performance for all of the occupants. The control system 10 provides improved performance to one or more occupants located in the vehicle 18 if the occupant or occupants currently located within the vehicle 18 is less than the total number of occupants the vehicle 18 is configured to seat.

For example, the ANC system may be able to provide a more quiet and refined driving experience for one occupant (e.g., the occupant in the driver seat 40) or for the occupants in just the front row seats (e.g., the occupants in the driver seat 40 and the front passenger seat 42) when compared to providing noise cancellation to all of the vehicle occupants when there are no occupants in the rear seats. Because the ANC system may be able to provide a greater level of noise cancellation to just the occupant located in the driver seat 40 (or the occupants in the driver seat 40 and the front passenger seat 42), the vehicle 18 may be able to operate an engine (not shown) more efficiently (e.g., more loudly). In particular, the vehicle powertrain modules (e.g., the transmission control module ("TCM") and the engine control module ("ECM")) may be tuned more aggressively for fuel economy or vehicle performance if the ANC system provides enhanced sound cancellation for the front seat occupants only.

In yet another example, if the vehicle system is the audio system, the audio control module 36 may adjust surround sound settings to provide an improved level of sound to just one or a few occupants in the vehicle 18.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle having a system, the system having at least one operating output, comprising:
   an occupant module receiving at least one occupant signal indicative of occupants currently located within the vehicle, the occupant module determining a current number of occupants in the vehicle based on the occupant signal; and
   a vehicle system module receiving as input the current number of occupants located in the vehicle, the vehicle system module configured to:
      determine if the current number of occupants located in the vehicle is less than a total number of occupants the vehicle is configured to seat; and
      adjust the at least one operating output of the system whether the current number of occupants located in the vehicle is less than the total number of occupants the vehicle is configured to seat,
   wherein the system is an active noise cancellation system and the at least one operating output is attenuation of unwanted noise,
   wherein an amount of sound cancellation provided to the occupants currently located within the vehicle is controlled by the active noise cancellation system to provide sound cancellation,
   wherein a vehicle powertrain module of the vehicle and an engine control module of the vehicle are tuned for fuel economy or vehicle performance when the active noise cancellation system provides the amount of sound cancellation to only front seat vehicle occupants of the occupants currently located.

2. The vehicle in claim 1, wherein the occupant module determines a specific seating position for each of the current number of occupants located in the vehicle.

3. The vehicle in claim 2, wherein the vehicle system module adjusts the at least one operating output based on the specific seating position of each of the current number of occupants located in the vehicle.

4. The vehicle in claim 2, wherein the specific seating position is one of a driver seat position, a front passenger seat position, a second row seat position, and a third row seat position.

5. The vehicle in claim 1, wherein the occupant signal is generated by a plurality of seatbelt sensors.

6. The vehicle in claim 1, wherein the occupant signal is generated by a plurality of occupant sensors, wherein each of the plurality of occupant sensors are located in a corresponding seat.

7. The vehicle in claim 1, wherein the front seat vehicle occupants of the occupants currently located include occupants located in a driver seat and a front passenger seat, and wherein the amount of sound cancellation provided to the driver seat and the front passenger seat is reduced to provide acceptable noise cancellation to the occupants in a second row seats.

8. A method of modifying at least one operating output of a system for a vehicle, comprising:
   receiving at least one occupant signal indicative of occupants currently located within the vehicle by an occupant module;
   determining a current number of occupants in the vehicle based on the occupant signal;
   receiving as input the current number of occupants located in the vehicle by a vehicle system module;
   determining if the current number of occupants located in the vehicle is less than a total number of occupants the vehicle is configured to seat by the vehicle system module; and
   adjusting the at least one operating output of the system based on whether the current number of occupants located in the vehicle is less than the total number of occupants the vehicle is configured to seat,
   wherein the system is an active noise cancellation system and the at least one operating output is attenuation of unwanted noise,
   wherein an amount of sound cancellation provided to the occupants currently located within the vehicle is controlled by the active noise cancellation system to provide sound cancellation,
   wherein a vehicle powertrain module of the vehicle and an engine control module of the vehicle are tuned for fuel economy or vehicle performance when the active noise cancellation system provides the amount of sound cancellation to only front seat vehicle occupants of the occupants currently located.

9. The method in claim 8, comprising determining a specific seating position for each of the current number of occupants located in the vehicle by the occupant module.

10. The system in claim 9, comprising adjusting the at least one operating output based on the specific seating position of each of the current number of occupants located in the vehicle by the vehicle system module.

11. The system in claim 8, wherein the occupant signal is generated by a plurality of seatbelt sensors.

12. The system in claim 8, wherein the occupant signal is generated by a plurality of occupant sensors, wherein each of the plurality of occupant sensors are located in a corresponding seat.

13. A vehicle having a system, the system having at least one operating output, comprising:
   an occupant module receiving at least one occupant signal indicative of occupants currently located within the vehicle, the occupant module determining a current number of occupants located in the vehicle based on the occupant signal and a specific seating position for each of the current number of occupants located in the vehicle; and
   a vehicle system module receiving as input the current number of occupants located in the vehicle, the vehicle system module configured to:
   determine if the current number of occupants located in the vehicle is less than a total number of occupants the vehicle is configured to seat; and
   adjust the at least one operating output of the system based on whether the current number of occupants located in the vehicle is less than the total number of occupants the vehicle is configured to seat and based on the specific seating position of each of the current number of occupants located in the vehicle,
   wherein the system is an active noise cancellation system and the at least one operating output is attenuation of unwanted noise,
   wherein an amount of sound cancellation provided to one of the occupants currently located within the vehicle is controlled by the active noise cancellation system to provide sound cancellation,
   wherein a vehicle powertrain module of the vehicle and an engine control module of the vehicle are tuned for fuel economy or vehicle performance when the active noise cancellation system provides the amount of sound cancellation to only front seat vehicle occupants of the occupants currently located.

* * * * *